United States Patent
Cormier et al.

(10) Patent No.: US 11,573,210 B2
(45) Date of Patent: Feb. 7, 2023

(54) DUAL MODE SAMPLE MANAGER

(71) Applicant: Waters Technologies Corporation, Milford, MA (US)

(72) Inventors: Sylvain Gilles Cormier, Mendon, MA (US); Joseph D. Michienzi, Plainville, MA (US)

(73) Assignee: WATERS TECHNOLOGIES CORPORATION, Milford, MA (US)

( * ) Notice: Subject to any disclaimer, the term of this patent is extended or adjusted under 35 U.S.C. 154(b) by 230 days.

(21) Appl. No.: 16/826,667

(22) Filed: Mar. 23, 2020

(65) Prior Publication Data
US 2020/0309743 A1 Oct. 1, 2020

Related U.S. Application Data

(60) Provisional application No. 62/823,241, filed on Mar. 25, 2019.

(51) Int. Cl.
*G01N 30/20* (2006.01)
*G01N 30/32* (2006.01)
(Continued)

(52) U.S. Cl.
CPC ............. *G01N 30/20* (2013.01); *G01N 30/32* (2013.01); *G01N 30/38* (2013.01);
(Continued)

(58) Field of Classification Search
CPC ................. B60C 11/243; B60C 11/246; B60C 2011/0341; B60C 2019/004;
(Continued)

(56) References Cited

U.S. PATENT DOCUMENTS

| 4,506,558 A | 3/1985 | Bakalyar |
| 5,714,676 A * | 2/1998 | Hase ...................... G01N 30/06 73/864.83 |

(Continued)

FOREIGN PATENT DOCUMENTS

| CN | 107430101 A | 12/2017 |
| EP | 3760292 A1 * | 1/2021 ......... B01D 15/1871 |

(Continued)

OTHER PUBLICATIONS

International Preliminary Report on Patentability in PCT/US2020/024166 dated Oct. 7, 2021.
(Continued)

*Primary Examiner* — Nimeshkumar D Patel
*Assistant Examiner* — Gedeon M Kidanu
(74) *Attorney, Agent, or Firm* — Schmeiser, Olsen & Watts LLP; William G. Guerin

(57) ABSTRACT

Described is a dual mode sample manager for a liquid chromatography system. The dual mode sample manager includes a sample needle, a sample loop, a metering pump, a needle seat and first and second valves. Each valve is configurable in two valve states to enable two modes of operation. In one mode, sample acquired and stored in the sample needle is injected into a chromatography system flow and, in the other mode, sample acquired through the sample needle and stored in the sample loop is injected into the chromatography system flow. The automated switching of the sample manager between the two modes of operation avoids the need for maintaining two separate liquid chromatography systems or manual reconfiguration of a chromatography system for users desiring the capability of both modes of operation.

11 Claims, 10 Drawing Sheets

(51) Int. Cl.
*G01N 30/38* (2006.01)
*G01N 30/02* (2006.01)

(52) U.S. Cl.
CPC . *G01N 2030/027* (2013.01); *G01N 2030/202* (2013.01); *G01N 2030/326* (2013.01); *G01N 2030/328* (2013.01)

(58) Field of Classification Search
CPC ...... B60C 2019/005; G01B 7/10; G01B 7/26; G01N 23/20075
See application file for complete search history.

(56) References Cited

U.S. PATENT DOCUMENTS

| | | | | | |
|---|---|---|---|---|---|
| 6,129,840 | A | * | 10/2000 | Kitaoka | G01N 30/34 210/101 |
| 8,257,586 | B2 | * | 9/2012 | Dehmer | G01N 30/20 210/656 |
| 8,770,046 | B2 | * | 7/2014 | Maeda | G01N 30/24 73/863.01 |
| 10,802,001 | B2 | * | 10/2020 | Burnett | G01N 1/38 |
| 10,955,391 | B2 | * | 3/2021 | Cormier | G01N 30/24 |
| 2002/0146349 | A1 | * | 10/2002 | Gygi | G01N 30/16 422/68.1 |
| 2008/0307861 | A1 | * | 12/2008 | Quinn | G01N 30/34 73/61.56 |
| 2011/0290042 | A1 | * | 12/2011 | Maeda | G01N 30/16 73/864.21 |
| 2012/0024048 | A1 | * | 2/2012 | Maeda | G01N 30/20 73/61.55 |
| 2012/0111127 | A1 | * | 5/2012 | Maeda | G01N 35/1097 73/863.01 |
| 2012/0132013 | A1 | * | 5/2012 | Glatz | G01N 30/20 73/863.02 |
| 2012/0305464 | A1 | * | 12/2012 | Cormier | G01N 30/20 137/1 |
| 2013/0067997 | A1 | | 3/2013 | Ebsen et al. | |
| 2015/0276690 | A1 | * | 10/2015 | Hudalla | B01J 20/205 73/23.39 |
| 2016/0077060 | A1 | | 3/2016 | Cormier et al. | |
| 2016/0077061 | A1 | | 3/2016 | Cormier | |
| 2016/0187304 | A1 | * | 6/2016 | Wikfors | G01N 30/20 73/863 |
| 2017/0106364 | A1 | * | 4/2017 | Tomita | G01N 35/1095 |
| 2017/0336369 | A1 | * | 11/2017 | Cormier | G01N 30/20 |
| 2018/0088091 | A1 | * | 3/2018 | Cormier | G01N 30/22 |
| 2018/0364203 | A1 | | 12/2018 | Burnett et al. | |
| 2020/0200717 | A1 | * | 6/2020 | Minato | G01N 35/1097 |

FOREIGN PATENT DOCUMENTS

WO    2013134222 A1    9/2013
WO    2016160157 A1    10/2016

OTHER PUBLICATIONS

International Search Report & Written Opinion in PCT/US2020/024166 dated Jun. 16, 2020.

* cited by examiner

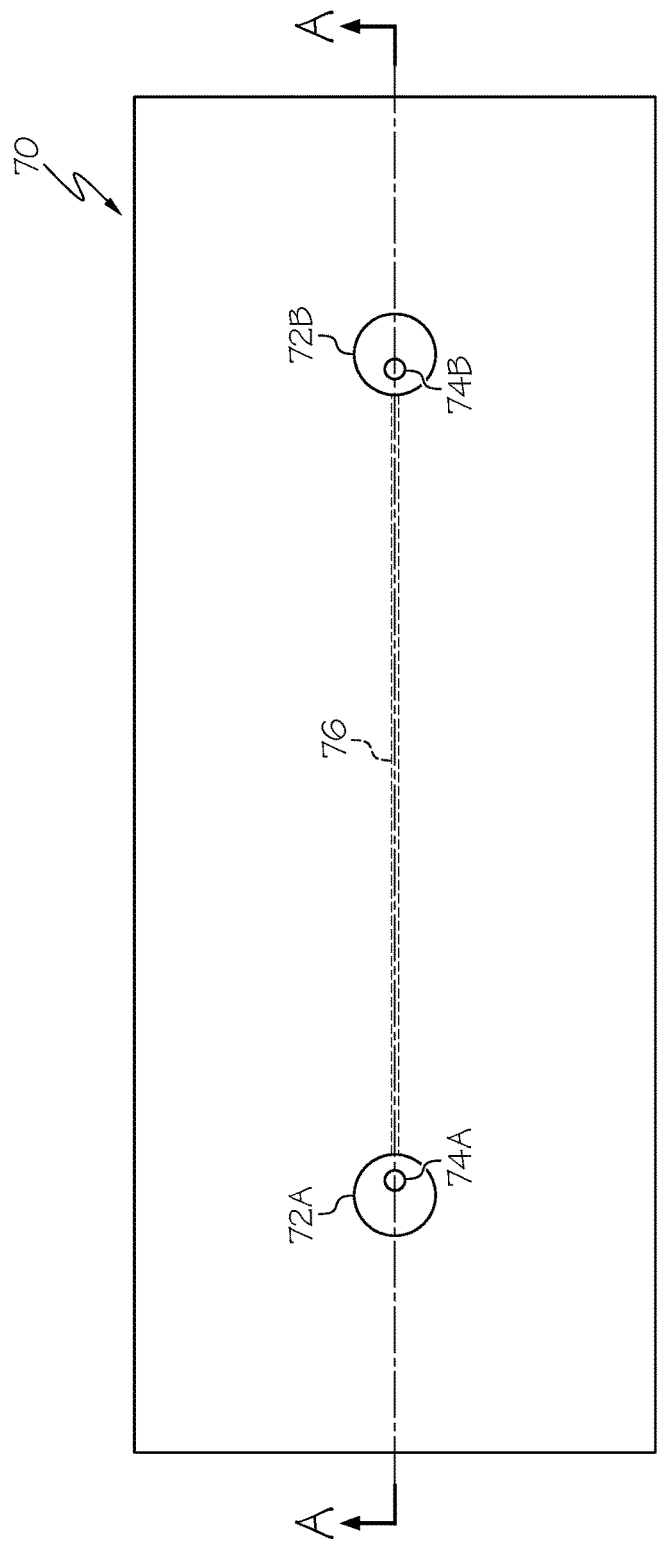
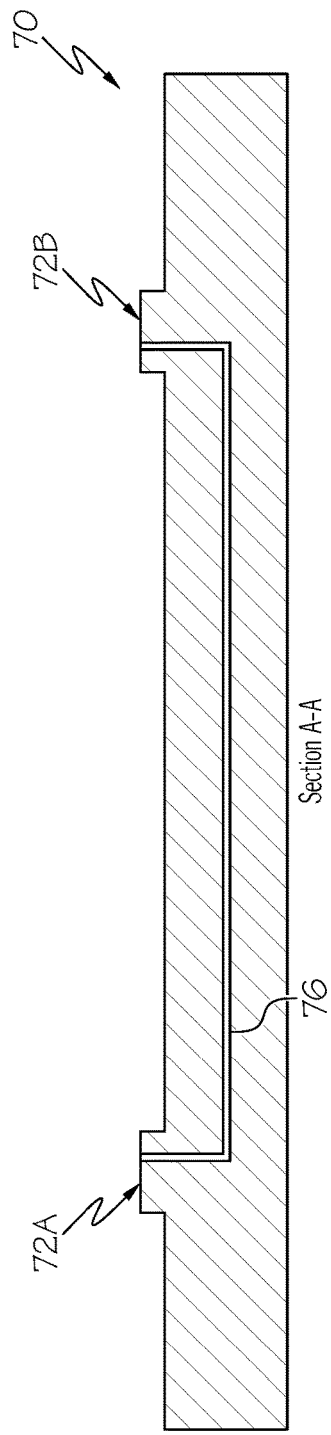
FIG. 10A
FIG. 10B
Section A-A

DUAL MODE SAMPLE MANAGER

RELATED APPLICATIONS

This application is a non-provisional patent application claiming priority to U.S. Provisional Patent Application No. 62/823,241 filed Mar. 25, 2019, entitled "Dual Mode Sample Manager," which is incorporated herein by reference.

FIELD OF THE INVENTION

The technology generally relates generally to sample managers for liquid chromatography systems. More particularly, the technology relates to a dual mode sample manager that provides flow-through needle and fixed loop modes of operation.

BACKGROUND

Liquid chromatography systems commonly use a sample manager to acquire a sample and inject the sample into the system flow (i.e., mobile phase) of the chromatography system. Some sample managers use a sample loop to store and inject a fixed volume of sample. Alternatively, other sample managers use a flow through needle to acquire and store the sample prior to injection.

Each type of sample manager has its own advantages. Depending on the types of analyses to be performed, an operator will select a chromatography system equipped with one type of sample manger. For example, dispersion, injection delay volume, gradient delay volume, the sample volume to be injection and sample waste are all factors that can influence the selection of the type of sample manager. To perform a wider range of analyses, it may be desirable to have two chromatography systems available; however, costs and equipment space may present challenges.

SUMMARY

Examples of the present disclosure include a dual mode sample manager for a liquid chromatography system. The dual mode sample manager can be provided as part of a liquid chromatography system that can operate in a fixed sample loop injection mode and a flow through needle injection mode. The particular mode is achieved through automated switching without any need for manual reconfiguration when changing between the two modes of operation.

In one example, a dual mode sample manager for a liquid chromatography system includes a sample needle, a sample loop, a metering pump, a needle seat, a first valve and a second valve. The sample needle is configured to acquire a sample from a sample source for injection into a chromatography system flow. The sample loop stores the sample for injection into the chromatography system flow. The metering pump is controllable to draw or dispense a volume of a liquid and the needle seat is configured to fluidically couple the sample needle to a fluidic path. The first valve has a plurality of first valve ports and is configurable in a first valve state wherein one of the first valve ports is configured in fluidic communication with at least one of the other first valve ports. The first valve is configurable in a second valve state wherein the one of the first valve ports is configured in fluidic communication with a different one of the other first valve ports. The first valve is in fluidic communication with the metering pump and is configured to receive a wash solvent and a chromatography system flow, and to deliver the received chromatography system flow. The second valve has a plurality of second valve ports and is configurable in the first valve state wherein one of the second valve ports is configured in fluidic communication with at least one of the other second valve ports. The second valve is configurable in the second valve state wherein the one of the second valve ports is configured in fluidic communication with a different one of the other second valve ports. The second valve is in fluidic communication with the sample needle, the needle seat and the sample loop. The first and second valves are configurable so that in one mode the sample acquired and stored in the sample needle is injected into the chromatography system flow and in another mode the sample acquired through the sample needle and stored in the sample loop is injected into the chromatography system flow.

The dual mode sample manager may include a source of wash solvent in fluidic communication with the metering pump. The dual mode sample manager may include the sample source.

The metering pump may be a metering syringe. At least one of the first and second valves may be a rotary shear seal valve.

In another example, a dual mode sample manager for a liquid chromatography system includes a sample needle, a sample loop, a metering pump, a needle seat, a first valve and a second valve. The sample needle is configured to acquire a sample from a sample source for injection into a chromatography system flow. The sample loop stores the sample for injection into the chromatography system flow. The metering pump is controllable to draw or dispense a volume of a liquid and the needle seat is configured to fluidically couple the sample needle to a fluidic path. The first valve has a rotor, a stator and a plurality of first valve ports. The stator has a stator surface. The first valve is configurable in a first valve state wherein one of the first valve ports is configured in fluidic communication with at least one of the other first valve ports and is configurable in a second valve state wherein the one of the first valve ports is configured in fluidic communication with a different one of the other first valve ports. The first valve is in fluidic communication with the metering pump and is configured to receive a wash solvent and a chromatography system flow, and to provide the received chromatography system flow. The second valve has a plurality of second valve ports. The second valve is configurable in the first valve state wherein one of the second valve ports is configured in fluidic communication with at least one of the other second valve ports and is configurable in the second valve state wherein the one of the second valve ports is configured in fluidic communication with a different one of the other second valve ports. The second valve is in fluidic communication with the sample needle, the needle seat and the sample loop. The stators of each of the first and second valves has a stator surface formed on a diffusion-bonded block. Each stator surface has at least one stator port in fluidic communication with a stator port of the other stator surface through an internal fluidic channel of the stator block. The first valve and second valves are configurable so that in one mode the sample acquired through the sample needle is injected into the chromatography system flow and in another mode the sample acquired through the sample needle and stored in the sample loop is injected into the chromatography system flow.

The dual mode sample manager may include a source of wash solvent in fluidic communication with the metering pump.

The dual mode sample manager may include a processor in communication with the metering pump and the first and second valves. The processor is configured to control the valve states of the first and second valves according to a selected mode of operation of the dual mode sample manager.

The first and second valves may be rotary shear seal valves. The metering pump may be a metering syringe. The sample loop may have a fixed volume.

In another example, a liquid chromatography system includes a solvent delivery system, a column manager including a chromatography separation column, a sample source and a fluidic network in fluidic communication with the sample source. The fluidic network includes a plurality of reconfigurable fluidic paths. When the liquid chromatography system is operated in a first mode, the fluidic paths are configured as a flow through needle sample manager and when the liquid chromatography system is operated in a second mode, the fluidic paths are configured as a fixed loop sample manager.

At least one of the fluidic paths may be common to the flow through needle sample manager and the fixed loop sample manager.

The flow through needle sample manager and the fixed loop sample manager may include a sample needle. The fixed loop sample manager may include a sample loop having a fixed volume. The flow through needle sample manager and the fixed loop sample manager may include a metering pump.

BRIEF DESCRIPTION OF THE DRAWINGS

The above and further advantages of this invention may be better understood by referring to the following description in conjunction with the accompanying drawings, in which like reference numerals indicate like elements and features in the various figures. Letters may be appended to reference numbers to distinguish from reference numbers for similar features and to indicate a correspondence to other features in the drawings. For clarity, not every element may be labeled in every figure. The drawings are not necessarily to scale, emphasis instead being placed upon illustrating the principles of the invention.

FIG. 10A and FIG. 10B are a simplified top view and a simplified side view, respectively, of an example of a stator block formed by a diffusion bonding process which can be used in a dual mode sample manager.

DETAILED DESCRIPTION

Reference in the specification to "one example" or "an example" means that a particular feature, structure or characteristic described in connection with the example is included in at least one example of the teaching. References to a particular example within the specification do not necessarily all refer to the same example.

The present teaching will now be described in more detail with reference to examples shown in the accompanying drawings. While the present teaching is described in conjunction with various examples, it is not intended that the present teaching be limited to such examples. On the contrary, the present teaching encompasses various alternatives, modifications and equivalents, as will be appreciated by those of skill in the art. Those of ordinary skill having access to the teaching herein will recognize additional implementations, modifications and examples, as well as other fields of use, which are within the scope of the present disclosure.

Figure 1:
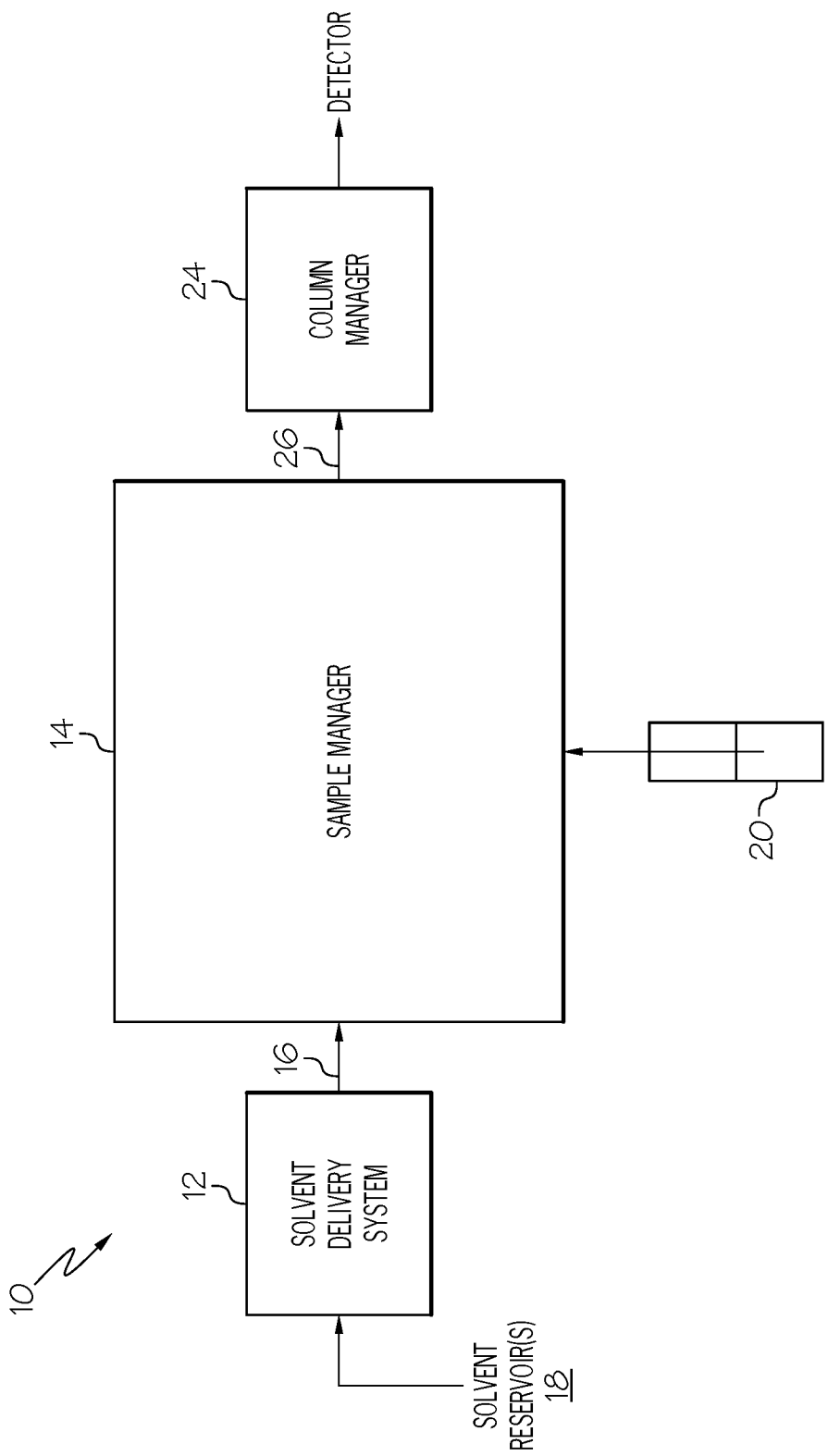
FIG. 1 is a block diagram of an example of a liquid chromatography system and shows a solvent delivery system in fluidic communication with a conventional sample manager.

FIG. 1 shows an example of a liquid chromatography system 10 for separating a sample into its constituents. The system 10 includes a solvent delivery system 12 in fluidic communication with a conventional sample manager 14 through tubing 16. Generally, the solvent delivery system 12 includes pumps (not shown) in fluidic communication with solvent reservoirs 18 from which the pumps draw solvents. In one embodiment, the solvent delivery system 12 is a binary solvent manager, which uses two individual serial flow pumps to draw solvents from their reservoirs 18 and delivers a solvent composition to the sample manager 14. An example implementation of a binary solvent manager is the ACQUITY UPLC® Binary Solvent Manager, manufactured by Waters Corp. of Milford, Mass. The pumps of the binary solvent manager can generate pressure as high as 18K psi (125 MPa).

The sample manager 14 is in fluidic communication with a sample source 20 from which the sample manager 14 acquires a sample. The sample source 20 can be, for example, a vial 20 containing the sample from which the sample manager 14 acquires the sample before injecting the sample into the solvent composition delivered by the solvent delivery system 12. The sample manager 14 includes a sample loop and a rotary injection valve configured to execute a sample injection sequence. Alternatively, the sample manager includes a flow through needle used to acquire and store the sample and further includes the rotary injection valve.

The sample manager 14 is in fluidic communication with a column manager 24 through tubing 26 which conducts the solvent composition, with the injected sample, to the column manager 24. The column manager 24 provides a temperature-controlled environment for one or more chromatography separation columns used to separate the sample-solvent composition. Each separation column is adapted to separate the various components (or analytes) of the sample from each other as the mobile passes through, and to elute the analytes from the separation column at different times. From the column manager 24, the constituents of the separated sample pass to a detector 28 or other equipment, for example, a mass spectrometer or a flame ionization detector, for analyzing the separation.

The chromatography system 10 further includes a data system (not shown) that is in signal communication with the solvent delivery system 12 and the sample manager 14. The data system includes a processor and a switch (e.g., an Ethernet switch) for handling signal communication between the solvent delivery system 12 and sample manager 14. In addition, the data system is programmed to implement the various phases of operation performed by the sample manager (e.g., turning pumps on and off) in order to inject the sample into the solvent composition stream. In addition, a host computing system (not shown) is in communication with the data system, by which personnel can enter and/or download various parameters and profiles to affect the data system performance.

In brief overview, examples disclosed below are directed to a dual mode sample manager that provides various advantages over the sample manager 14 described above with respect to claim 1. The dual mode sample manager allows automated switching between a fixed sample loop injection mode and a flow through needle injection mode. No manual reconfiguration is required when switching between the two modes. In the past, users desiring sample managers adapted for both modes of operation had to access two distinct systems where each system was limited to only one mode of injection.

A sample manager utilizing a fixed volume sample loop for injection typically has certain advantages over sample managers utilizing a flow through needle for injection. The flow through needle normally has a longer fluidic path defined by the path from the injection valve to the needle and the path from a needle seat back to the injection valve. In contrast, the fixed loop fluidic path is defined by a sample loop coupled to two ports on the injection valve. Consequently, the lower system volume of the fixed loop configuration sample manager results in lower dispersion. Moreover, the injection delay volume, corresponding to the duration between the time when an injection is initiated and the time the sample reaches the chromatography column, is generally less for the fixed loop configuration. Similarly, the gradient delay volume, corresponding to the duration between the time a gradient mobile phase is initiated and the time the gradient mobile phase first reaches the column, is typically less for the fixed loop configuration.

Conversely, a sample manager with a flow through needle has certain advantages over a fixed loop sample manager. First, the amount of sample injected with a fixed loop configuration cannot exceed the volume of the sample loop. In contrast, the flow through needle generally can acquire and inject a larger sample volume due to the greater available volume of the needle and the volume of the fluidic path that couples the needle to the injection valve. Another advantage is the ability to limit sample waste by acquiring only the amount of sample desired for injection whereas the fixed loop configuration generally acquires a volume of sample equal to the sample loop volume plus a significant additional volume. More specifically, to load a fixed sample loop, the sample drawn from a sample vial must be drawn through a first fluidic path from the sample vial to the injection valve and into a second fluidic path that is coupled to another port on the injection valve. The sample volume drawn into the second fluidic path equals or exceeds the sample loop volume to ensure that the full volume of the sample loop can be filled with sample. Generally, the volume of sample remaining in the first fluidic path after completion of the loading step is flushed to waste during a subsequent cleaning step performed prior to injection.

Figure 2:
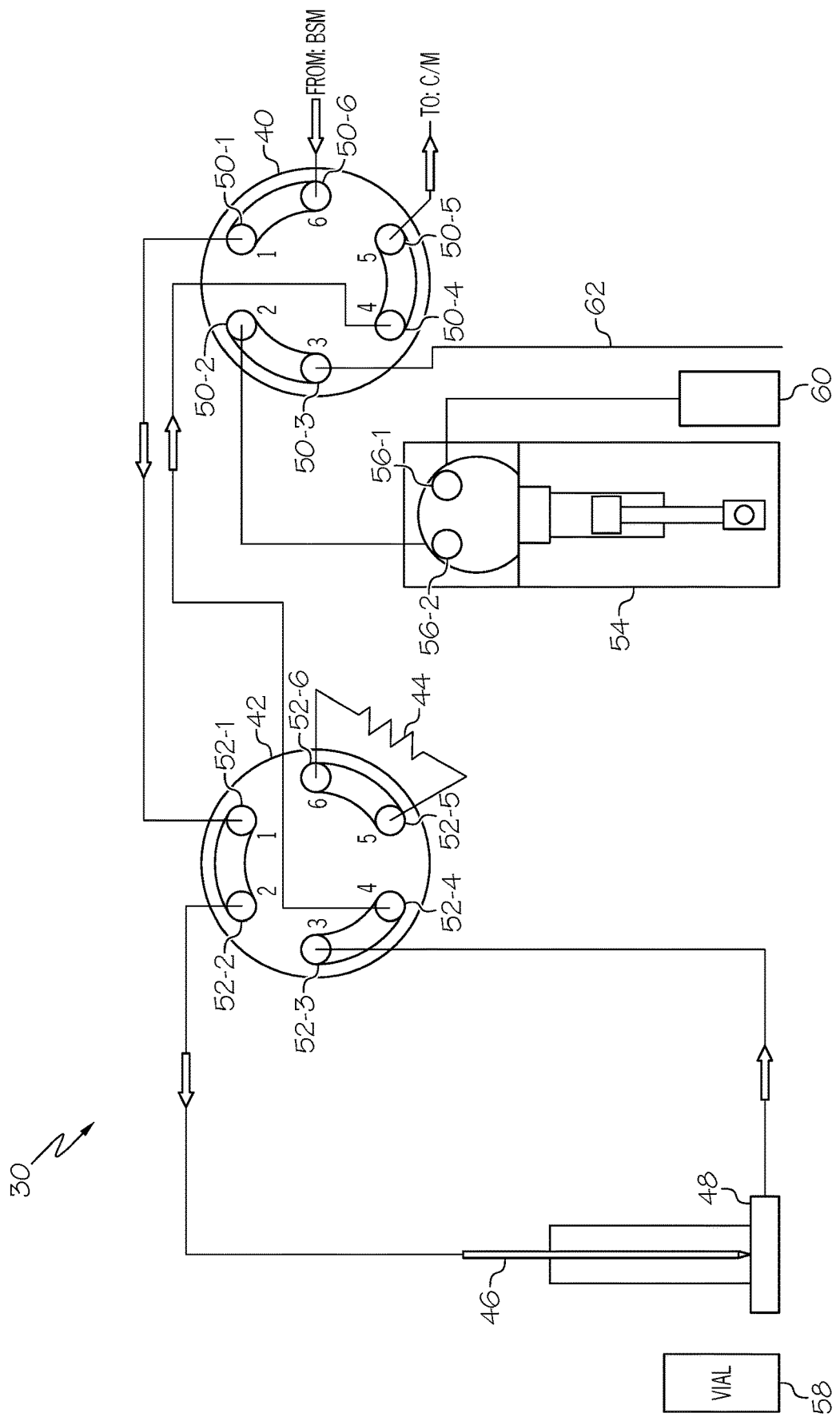
FIG. 2 is a schematic block diagram of an example of a dual mode sample manager for a liquid chromatography system according to a flow through needle injection mode.

FIG. 2 is a schematic block diagram of an example of a dual mode sample manager 30 for a liquid chromatography system. The sample manager 30 includes a fluidic network having reconfigurable fluidic paths. The sample manager 30 provides a user the capability to operate in either of two modes. The particular mode of operation may be selected by a user through a user interface in communication with a processor (not shown). The processor controls the valve states of fluidic valves within the fluidic network to define different configurations of the fluidic paths. One mode of operation includes performing a flow through needle injection and the second mode includes performing a fixed loop injection. A single fluidic path may be common to a state (e.g., draw sample, load sample, inject sample) of both modes.

The sample manager 30 includes a first fluidic valve 40, a second fluidic valve 42, a sample loop 44, a sample needle 46, a needle seat 48 and a pump 54. The sample needle 46 is alternatively referred to herein as a flow through needle, for example, when the sample manager 30 is operated according to a flow through needle injection mode. It will be recognized that a sample needle and a flow through needle may be structurally equivalent in the various examples disclosed herein.

The fluidic valves 40 and 42 can be any valve that can be reconfigured (i.e., "switched") between at least two valve states so that in one valve state a valve port is configured in fluidic communication with at least one of the other valve ports and so that in another valve state the same valve port is configured in fluidic communication with at least one different one of the other valve ports. As illustrated, the valves 40 and 42 are six-port rotary shear seal valves each having a stator and rotor and being configurable in one of two valve states. The first and second valve states are defined such that one port on the valve is internally directly coupled to only one other port on that valve. Individual valve ports are designated as either 50-N or 52-N corresponding to valves 40 or 42, respectively where "N" is a "port number" with a value that indicates a specific one of the ports. The first valve state corresponds to a valve having port 1 coupled to port 2, port 3 coupled to port 4 and port 5 coupled to port 6. The second valve state corresponds to a valve having port 1 coupled to port 6, port 2 coupled to port 3 and port 4 coupled to port 5. The rotor includes a channel (e.g., a groove on the rotor surface) that allow liquid received at one of the valve ports to be directed to flow out from another one of the valve ports according to the valve state. Each valve 40, 42 can be configured to switch between the first and second valve states by a 60° rotation (clockwise or counterclockwise) of the rotor with respect to the stator.

The sample loop 44 is coupled at its ends to port 52-5 and 52-6 of the second valve 12. The sample loop 44 can be loaded with a fixed volume of sample. The fixed volume may be determined by the inner diameter and length of the sample loop 44.

The sample needle 46 may be a stainless-steel needle and may include a flexible portion (e.g., flexible tubing) to fluidically couple to a port 52-2 on the second valve 42, either directly or through intervening tubing. Alternatively, the sample needle 46 may be formed of a different material such as titanium or an alloy such as Nitronic® 60. The sample needle 46 is movable to allow placement into a sample source (e.g., sample vial) 58 from which a volume of sample is acquired and to allow repositioning into the needle seat 48. The needle seat 48 is in communication with a port 52-3 on the second valve 42.

The pump 54, as illustrated, is a metering syringe pump which has a piston that can be retracted to draw an accurate volume of liquid into the pump and which can be extended to dispense an accurate volume of liquid from the pump 54. The pump 54 includes a first pump port 56-1 coupled to a source 60 of wash solvent and a second pump port 56-2 in communication with a port 50-2 on the first valve 40.

Flow Through Needle Injection Mode

Referring again to FIG. 2, the dual mode sample manager 30 is shown configured for operation according to the flow through needle injection mode. The first and second valves 40 and 42, respectively, are shown in a second valve state and in a first valve state, respectively. A chromatography system flow (i.e., a mobile phase) from a source of mobile phase flows into port 50-6 and out from port 50-1, and into port 52-1 and out from port 52-2 to the flow through needle 46. The system flow is received from a binary solvent manager (BSM), which provides a gradient mobile phase having a time-dependent contribution of two solvents such that the relative contribution rate of each solvent to the mobile phase composition changes over time. Alternatively, the system flow may be a gradient mobile phase comprised of three or more solvents or may be an isocratic mobile phase such that its composition does not change over time. The flow through needle 46 engages the needle seat 48, so that the flow continues into port 52-3, exits from port 52-4 into port 50-4 and out from port 50-5 toward the chromatography column in the column manager (C/M).

Figure 3:
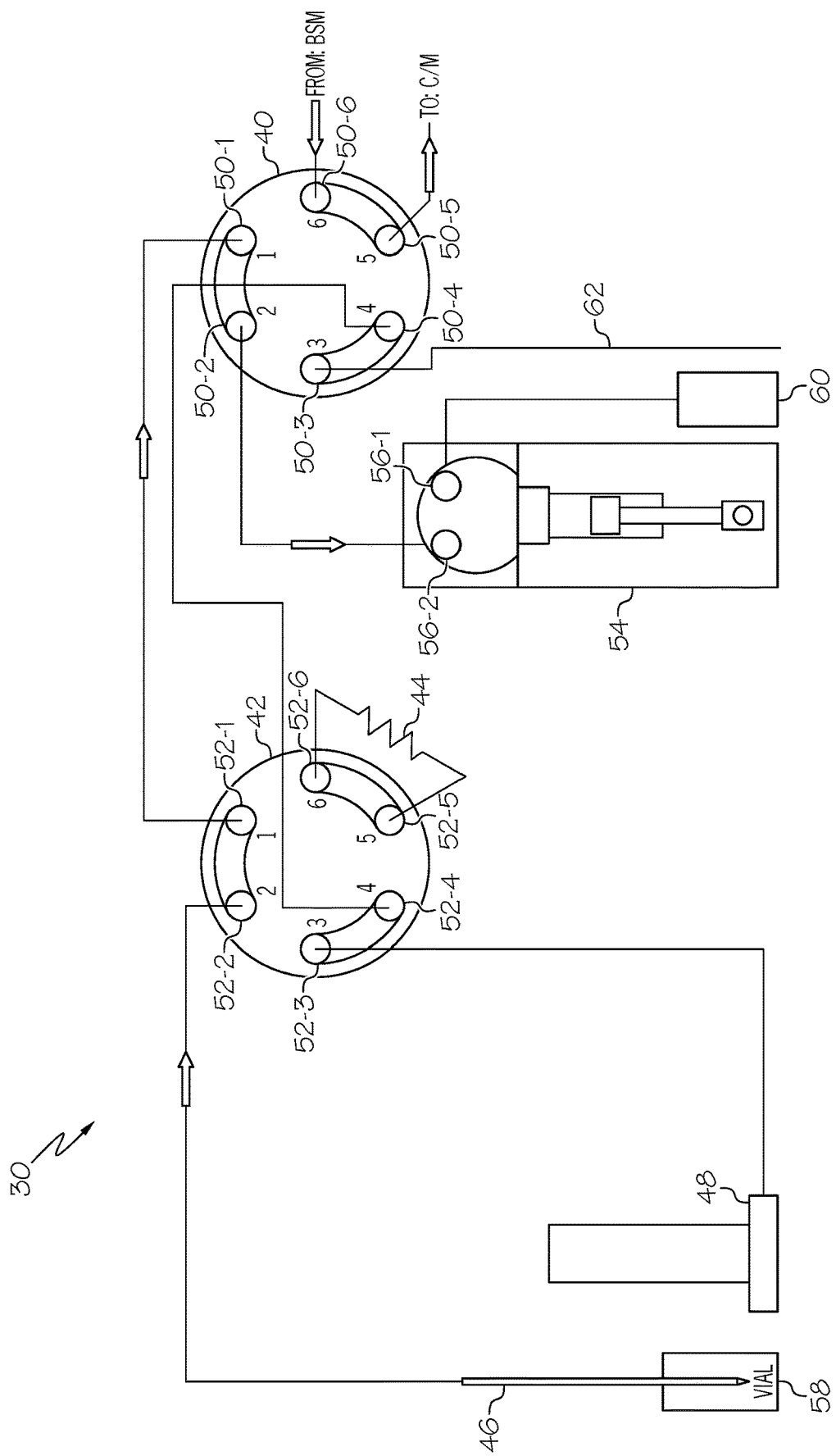
FIG. 3 shows the dual mode sample manager of FIG. 2 configured to load a sample prior to injection.

FIG. 3 illustrates the dual mode sample manager 30 configured to load a sample prior to injection. To achieve this configuration, the flow through needle 46 is removed from the needle seat 48 and moved to the sample vial 58 that contains a supply of the sample to be injected. In addition, the first valve 40 is switched from the second valve state to the first valve state while the second valve 42 remains in the first valve state.

In this configuration, the chromatography system flow received at port 50-6 exits the first valve 40 at port 50-5 and flows to the chromatography column. The piston in the metering pump 54 is retracted so that the liquid flows toward the second pump port 56-2. Consequently, the liquid in the flow through needle 46 is drawn into port 52-2 and out from port 52-1 of the second valve 42, and into port 50-1 and out from port 50-2 of the first valve 40 toward the metering pump 54. The retraction of the piston is controlled so that a desired amount of sample is drawn from the sample vial 58 into the flow through needle 46 and, in some loading instances, further into the fluidic conduits leading to the second valve 42 and possibly the first valve 40. Thus, the volume of sample that can be acquired for injection may be smaller or larger than the fixed volume of the sample loop 44.

Figure 4:
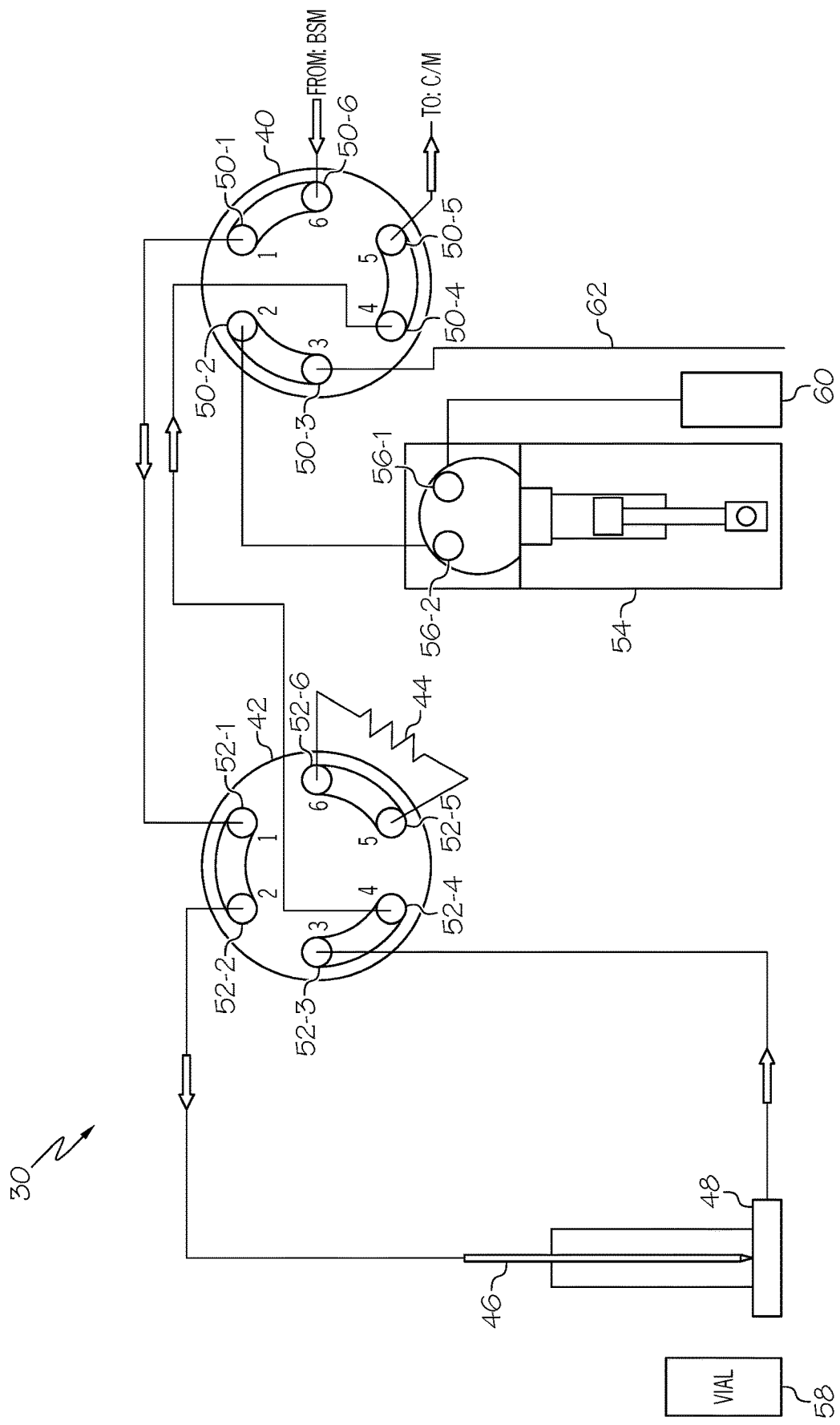
FIG. 4 shows the dual mode sample manager of FIG. 3 configured for injection of the acquired sample into a chromatography system flow.

FIG. 4 illustrates the dual mode sample manager 30 configured for injection of the acquired sample into the chromatography system flow. The reconfiguration from the load configuration shown in FIG. 3 is accomplished by moving the flow through needle 46 from the sample vial 58 and into the needle seat 48. In addition, the first valve 40 is switched to the second valve state while the second valve 42 remains in the first valve state.

The reconfiguration allows the chromatography system flow received at port 50-6 of the first valve 40 to exit at port 50-1 and flow into port 52-1 and exit at port 52-2 of the second valve 42. The system flow pushes the acquired sample through the flow through needle 46 out through the needle seat 48, into port 52-3 and out from port 52-4 of the second valve 42 and into port 50-4 and out from port 50-5 of the first valve 40 toward the chromatography column. After the sample is loaded on the column, the system flow continues to flow as shown in the illustrated configuration, which is similar to the configuration of FIG. 2 in which only the system flow is present in the sample manager 30. During this time, the system flow may change according to a desired gradient composition.

Fixed Loop Injection Mode

Figure 5:
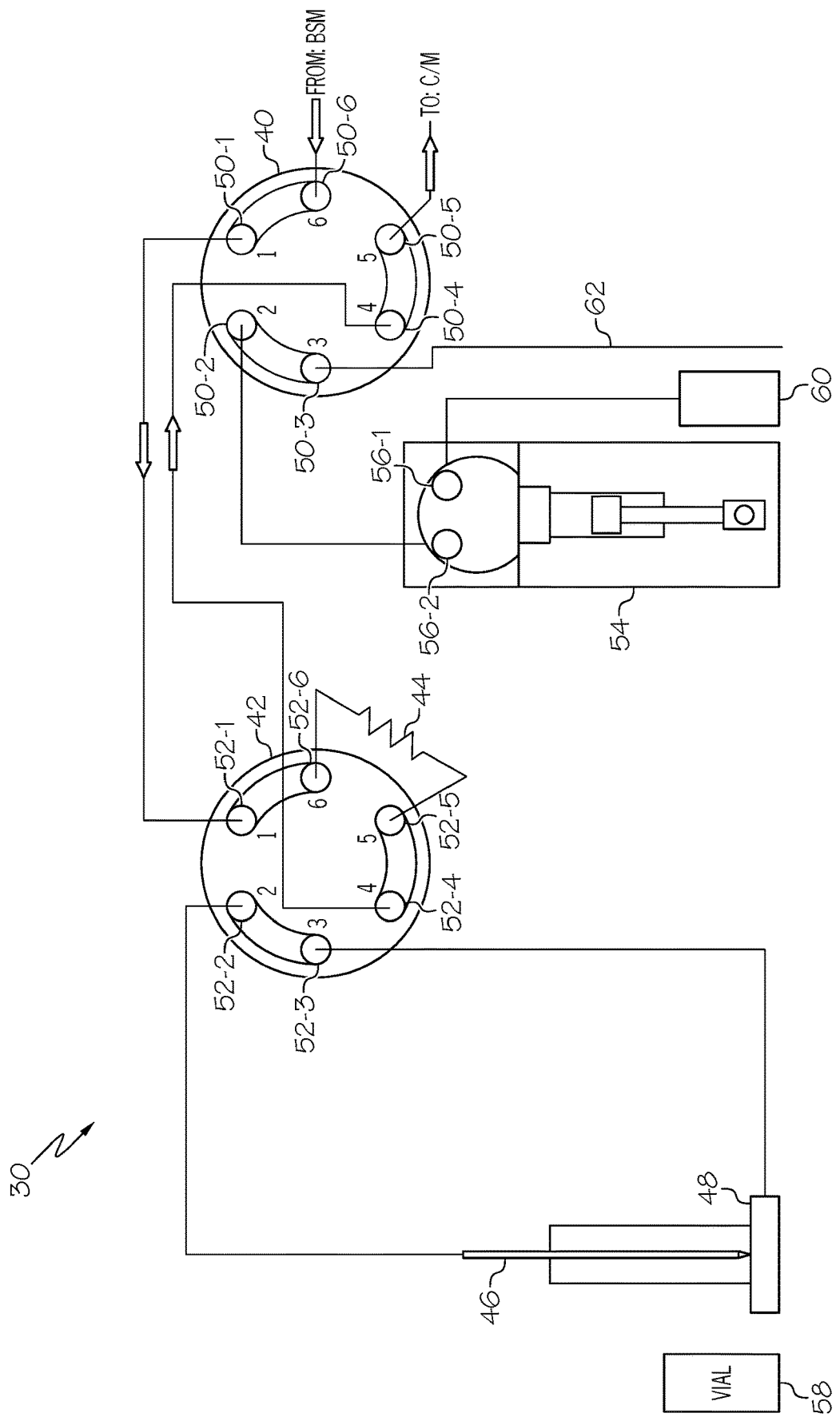
FIG. 5 shows the dual mode sample manager of FIG. 2 reconfigured for operation according to a fixed loop injection mode.

FIG. 5 shows the dual mode sample manager 30 configured for operation according to the fixed loop injection mode. The first and second valves 40 and 42 are both in the second valve state. The chromatography system flow is received at port 50-6 and flows out from port 50-1 of the first valve 40, into port 52-1 and out from port 52-6 of the second valve 42, and into the sample loop 44. The system flow exits the sample loop 44, flows into port 52-5 and out from port 52-4 of the second valve 42, and into port 50-4 and out from port 50-5 of the first valve 40 toward the chromatography column.

Figure 6:
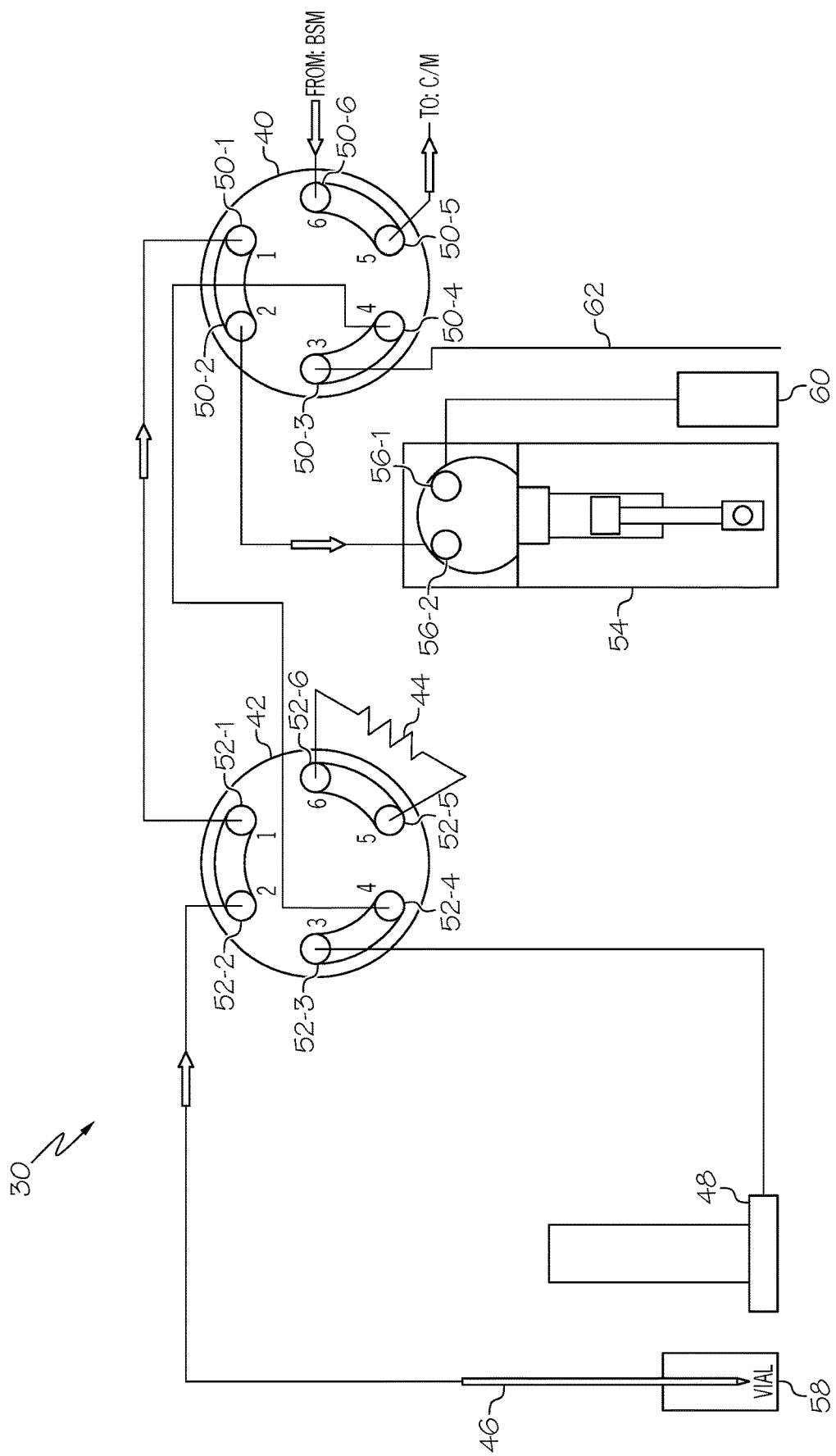
FIG. 6 shows the dual mode sample manager of FIG. 5 configured to draw a sample from a sample source.

To acquire sample, the sample needle 46 is inserted into the sample vial 58 and both valves 40 and 42 are switched to the first valve state, as illustrated in FIG. 6. In this configuration, the piston of the metering pump 54 is retracted so that sample is drawn through the sample needle 46, into port 52-2 and out from port 52-1 of the second valve 42. The flow from port 52-1 passes into port 50-1 and out from port 50-2 of the first valve 40 toward the metering pump 54. The volume of sample drawn from the second valve 42 toward the first valve 40 should exceed the fixed volume of the sample loop 44 to allow for complete filling of the sample loop 44, as described below with respect to FIG. 7.

Figure 7:
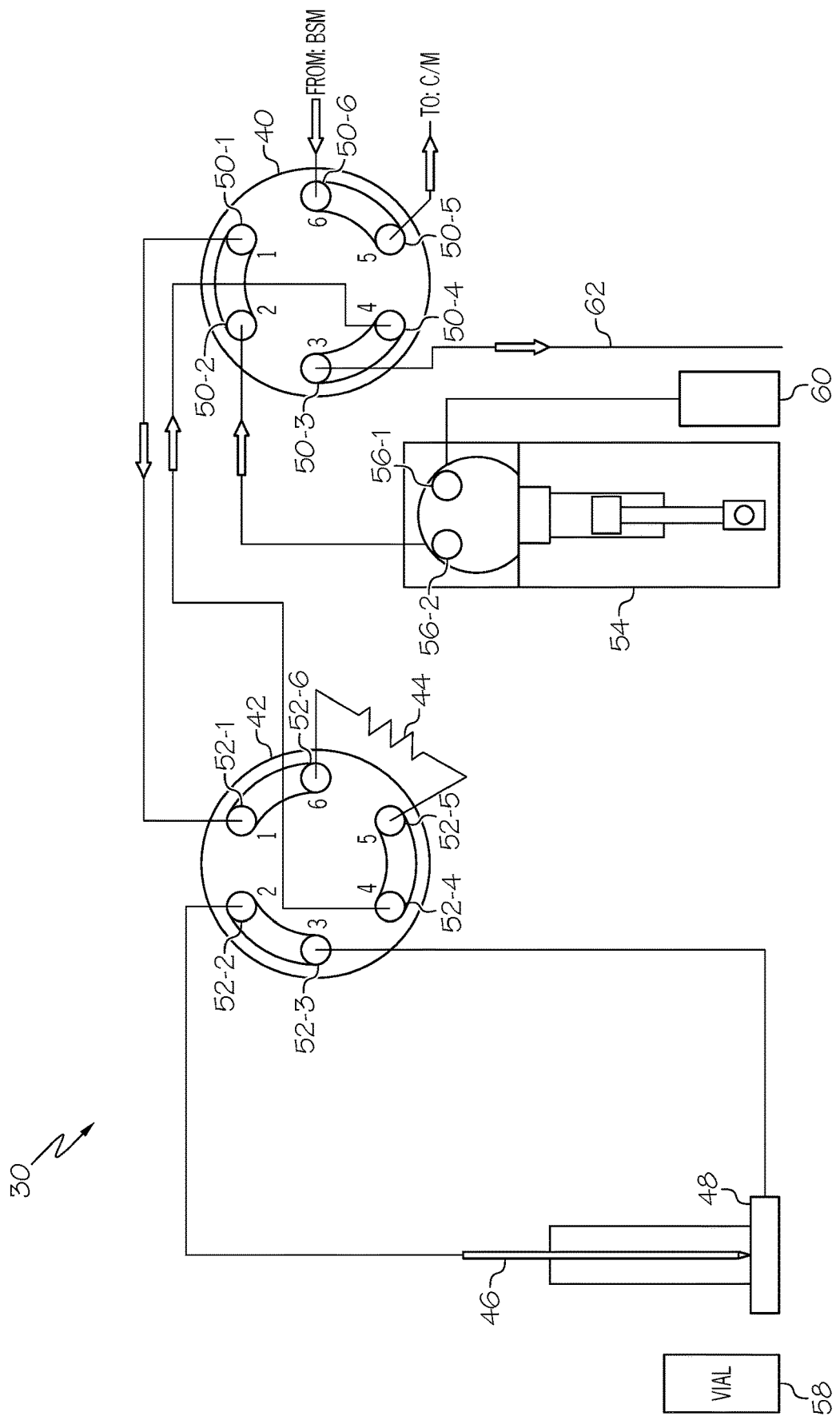
FIG. 7 shows the dual mode sample manager of FIG. 6 configured to load the drawn sample into the sample loop.

To load the sample loop 44, the dual mode sample manager 30 is reconfigured as shown in FIG. 7. To achieve this configuration, the sample needle 46 is removed from the sample vial 58 and inserted into the needle seat 48. In addition, the second valve 42 is switched from the first valve state to the second valve state while the first valve 40 remains in the first valve state.

During loading, the metering pump 54 pushes wash solvent (acquired from a wash solvent source 60) out through pump port 56-2 so that liquid flows into port 50-2 and out from port 50-1 of the first valve 40, into port 52-1 and out from port 52-6 of the second valve 42, through the sample loop 44, and into port 52-5 and out from port 52-4 of the second valve 42. The liquid also flows into the first valve 40 at port 50-4 and out from port 50-3 into a waste channel 62. The volume of wash solvent delivered by the pump 44 pushes the previously acquired sample so that the sample loop 44 is fully occupied by sample.

Figure 8:
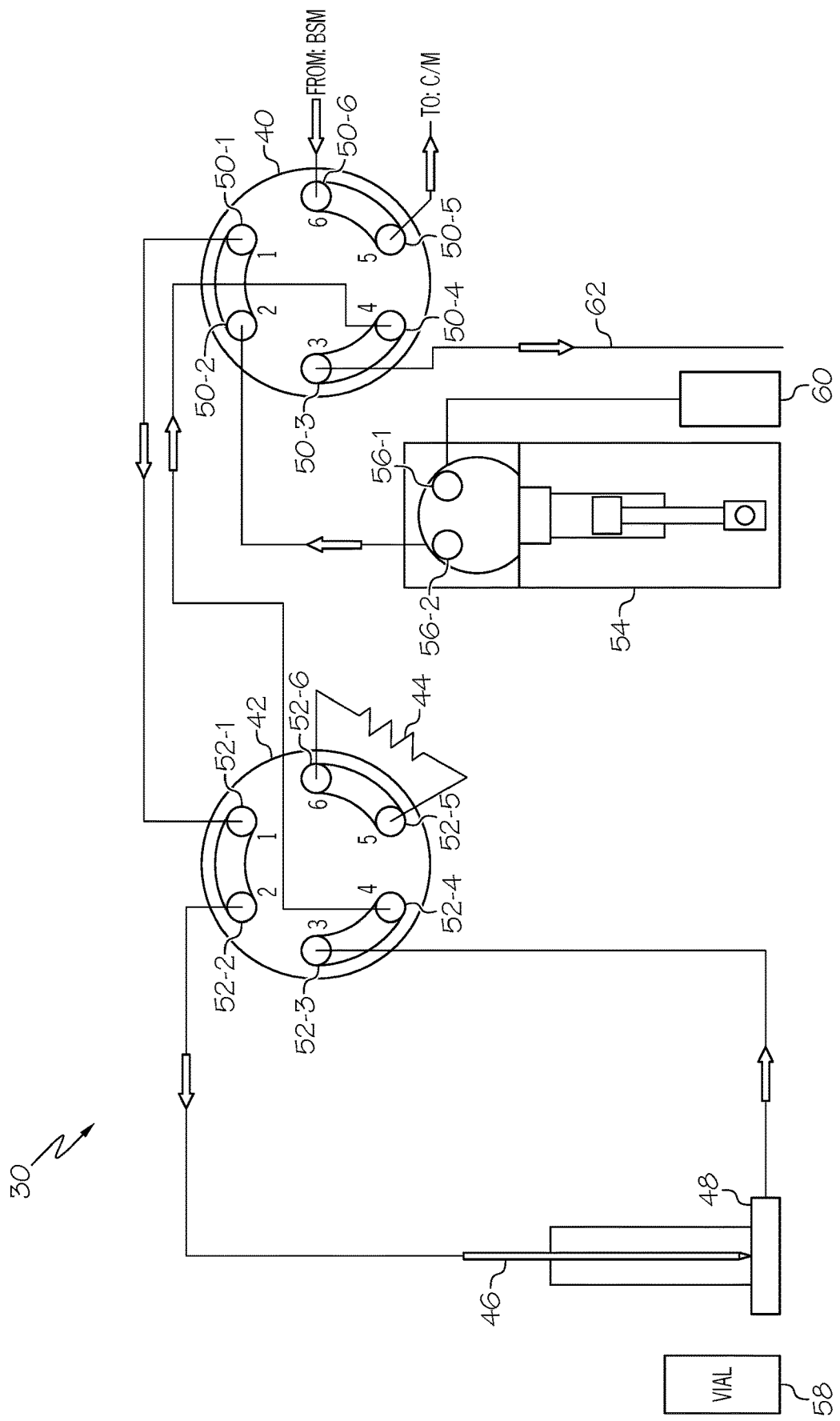
FIG. 8 shows the dual mode sample manager of FIG. 7 configured for performing a cleaning process to wash any acquired sample, other than the sample in the sample loop, to waste.

Once the loading of the sample loop 44 is completed, reconfiguration is performed to allow for a cleaning process so that any sample in the dual mode sample manager 30, other than the sample in the sample loop 44, is washed out through the waste channel 62. As shown in FIG. 8, reconfiguration is accomplished by switching the second valve 42 into the first valve state while the first valve 40 remains in the first valve state.

During the cleaning process, the metering pump 54 pushes wash solvent out through pump port 56-2 so that the wash solvent flows into port 50-2 and out from port 50-1 of the first valve 40, into port 52-1 and out from port 52-2 of the second valve 42, through the sample needle 46, into port 5-3 and out from port 52-4 of the second valve 42, and into port 50-4 and out from port 50-3 of the first valve 40 into the waste channel 62.

Figure 9:
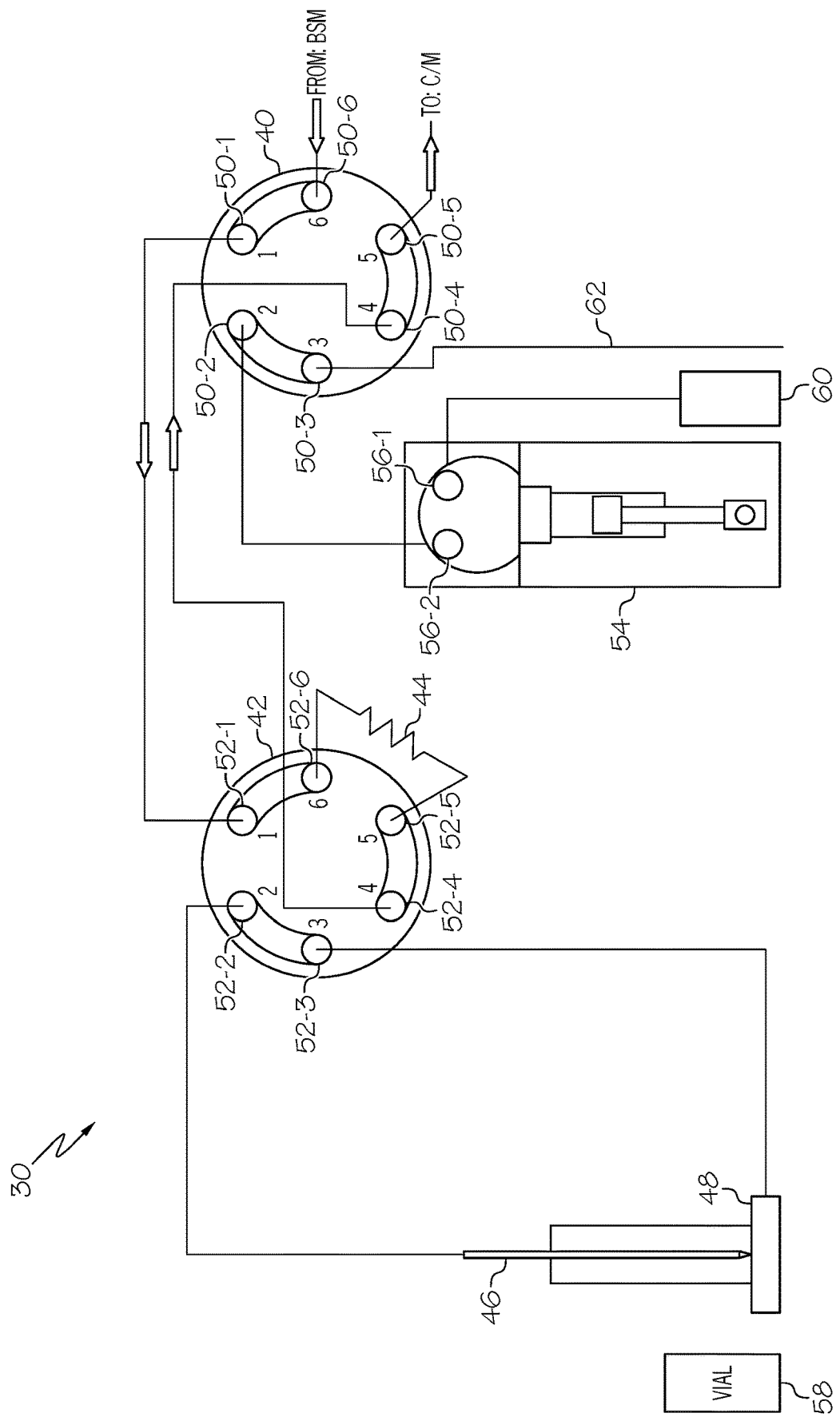
FIG. 9 shows the dual mode sample manager of FIG. 8 configured for injection of the sample in the sample loop into the chromatography system flow.

At the end of the cleaning process, the only sample remaining in the dual mode sample manager 30 is inside the sample loop 44. The dual mode sample manager 30 is then ready to inject the sample into the chromatography system flow. The dual mode sample manager 30 is subsequently reconfigured for injection as shown in FIG. 9. Reconfiguration includes switching both the first valve 40 and the second valve 42 into the second valve state.

During injection, the chromatography system flow is received at port 50-6 and exists from port 50-1 of the first valve 40, flows into port 52-1 and out from port 52-6 of the second valve 42, through the sample loop 44, into port 52-5 and out from port 52-4 of the second valve 42, into port 50-4 and out from port 50-5 of the first valve 40 toward the chromatography column. After the sample is loaded on the column, the system flow continues to flow as shown in the illustrated configuration which is similar to the configuration of FIG. 5 in which only the system flow is present in the dual mode sample manager 30. During this time, the system flow may change according to a desired gradient composition.

In some implementations, the valves and their interconnected conduits include a stator array formed in a diffusion-bonded structure. For example, for the first and second valves 40 and 42 valves implemented as rotary shear seal valves, the valve stators may be formed in a diffusion-bonded block.

FIGS. 10A and 10B are simplified illustrations of a diffusion-bonded stator block 70 having two stator surfaces 72A and 72B. The stator block 70 may be fabricated as a single plate using a solid-state diffusion bonding process in which two or more parallel layers of material are joined together. The layers are forced against each other under pressure at an elevated temperature (e.g., a temperature in a range of about 50% to 90% of the absolute melting point of the material) for a duration ranging from a few minutes to several hours). The pressure and temperature are then reduced before repeating one or more additional cycles at the elevated temperature and pressure. Examples of materials used to create the diffusion-bonded stator block include titanium, stainless steel, and various types of ceramics and polymers.

When assembled as a rotary valve array, each stator surface 72 on the stator block 70 engages a rotor surface of a corresponding actuator portion of one of the rotary valves. The actuator portions may be secured to the stator block 70 using bolts that engage bolt holes (not shown) in the stator block 70. Each stator surface 72 includes a stator port 74A, 74B. An internal fluidic channel 76 extends between and fluidically couples the two stator ports 74A and 74B to each other. Additional internal fluidic channels may be provided between additional stator ports on the stator surfaces 72 and from a stator port to a separate external port (i.e., not on a stator surface 72) on the stator block 70. By way of an example, the fluidic channel in FIG. 2 that couples port 50-1 of the first valve 40 to port 52-1 of the second valve 42 can be one of the internal fluidic channels in the diffusion-bonded stator block 70. Similarly, the fluidic channel that couples port 50-4 of the first valve 40 to port 52-4 of the second valve 42 can be another internal fluidic channel.

In another example, the sample loop 44 (see FIG. 2) may be formed as an internal fluidic channel in the stator block 70. Advantageously, the manufacturing tolerances for the inner diameter and the length of a sample loop formed inside the stator block 70 results in smaller variations in sample loop volumes between chromatography systems configured with similar internal sample loops as compared with chromatography systems utilizing external sample loops.

The use of the diffusion-bonded stator block 70 reduces the number of tubes for providing fluidic connection between the rotary valves of the dual mode sample manager. By eliminating tubing connections, the rotary valve array is more robust and leaks and possible contamination points are significantly reduced. In addition, dispersion is significantly reduced as the unswept volumes associated with tubing connectors are eliminated. Use of the stator block 70 reduces the complexity and time required to set up the dual mode sample manager.

Although generally described with respect to the use of two fluidic switching valves above, in other implementations the dual mode sample manager utilizes a single fluidic switching valve. For example, a rotary valve having additional external ports than those in the examples described above may be use. Additionally, the channels (e.g., grooves) on the rotor surface may be different. In some instances, the injection delay and gradient delay may be reduced relative to the examples described above.

While the invention has been shown and described with reference to specific embodiments, it should be understood by those skilled in the art that various changes in form and detail may be made therein without departing from the scope of the invention as recited in the accompanying claims.

What is claimed is:

1. A dual mode sample manager for a liquid chromatography system, comprising:
 a sample needle to acquire a sample from a sample source for injection into a chromatography system flow;
 a sample loop having a fixed volume;
 a metering pump controllable to draw or dispense a volume of a liquid;
 a needle seat configured to fluidically couple the sample needle in a first fluidic path;
 a first valve having a plurality of first valve ports and being configurable in a first valve state wherein one of the first valve ports is configured in fluidic communication with at least one of the other first valve ports and configurable in a second valve state wherein the one of the first valve ports is configured in fluidic communication with a different one of the other first valve ports, the first valve being in fluidic communication with the metering pump and configured to receive a wash solvent and a chromatography system flow, and to deliver the received chromatography system flow; and
 a second valve having a plurality of second valve ports and being configurable in the first valve state wherein one of the second valve ports is configured in fluidic communication with at least one of the other second valve ports and configurable in the second valve state wherein the one of the second valve ports is configured in fluidic communication with a different one of the other second valve ports, the second valve having a first pair of second valve ports coupled to ends of the first fluidic path and having a second pair of second valve ports coupled to ends of a second fluidic path defined by the fixed sample loop,
 wherein the first valve and second valve are configurable so that in one mode the sample acquired and stored in the first fluidic path is injected into the chromatography system flow and in another mode the sample acquired through the sample needle and stored in the second fluidic path is injected into the chromatography system flow.

2. The dual mode sample manager of claim 1 further comprising a source of wash solvent in fluidic communication with the metering pump.

3. The dual mode sample manager of claim 1 wherein the metering pump is a metering syringe.

4. The dual mode sample manager of claim 1 wherein at least one of the first valve and the second valve is a rotary shear seal valve.

5. The dual mode sample manager of claim 1 further comprising the sample source.

6. A dual mode sample manager for a liquid chromatography system, comprising:
  a sample needle to acquire a sample from a sample source for injection into a chromatography system flow;
  a fixed sample loop;
  a metering pump controllable to draw or dispense a volume of a liquid;
  a needle seat configured to fluidically couple the sample needle in a first fluidic path;
  a first valve having a rotor, a stator and a plurality of first valve ports, the stator having a stator surface, the first valve being configurable in a first valve state wherein one of the first valve ports is configured in fluidic communication with at least one of the other first valve ports and configurable in a second valve state wherein the one of the first valve ports is configured in fluidic communication with a different one of the other first valve ports, the first valve being in fluidic communication with the metering pump and configured to receive a wash solvent and a chromatography system flow, and to provide the received chromatography system flow; and
  a second valve having a plurality of second valve ports and being configurable in the first valve state wherein one of the second valve ports is configured in fluidic communication with at least one of the other second valve ports and configurable in the second valve state wherein the one of the second valve ports is configured in fluidic communication with a different one of the other second valve ports, the second valve having a first pair of second valve ports coupled to ends of the first fluidic path and having a second pair of second valve ports coupled to ends of a second fluidic path defined by the fixed sample loop,
  wherein the stators of the first and second valves each have a stator surface formed on a diffusion-bonded block, the stator surfaces each having at least one stator port in fluidic communication with a stator port of the other stator surface through an internal fluidic channel of the stator block, and wherein the first valve and second valves are configurable so that in one mode the sample acquired through the sample needle and stored in the first fluidic path is injected into the chromatography system flow and in another mode the sample acquired through the sample needle and stored in the second fluidic path is injected into the chromatography system flow.

7. The dual mode sample manager of claim 6 wherein the first and second valves are rotary shear seal valves.

8. The dual mode sample manager of claim 6 wherein the metering pump is a metering syringe.

9. The dual mode sample manager of claim 6 wherein the fixed sample loop has a fixed volume.

10. The dual mode sample manager of claim 6 further comprising a source of wash solvent in fluidic communication with the metering pump.

11. The dual mode sample manager of claim 6 further comprising a processor in communication with the metering pump and the first and second valves, the processor configured to control the valve states of the first and second valves according to a selected mode of operation of the dual mode sample manager.

\* \* \* \* \*